United States Patent
Delp et al.

(10) Patent No.: US 8,521,398 B2
(45) Date of Patent: Aug. 27, 2013

(54) METHOD AND CONTROL DEVICE FOR ADAPTING A MINIMUM VALVE STROKE

(75) Inventors: Matthias Delp, Bad Abbach (DE); Jürgen Dingl, Regensburg (DE)

(73) Assignee: Continental Automotive GmbH, Hannover (DE)

(*) Notice: Subject to any disclaimer, the term of this patent is extended or adjusted under 35 U.S.C. 154(b) by 1268 days.

(21) Appl. No.: 12/350,396

(22) Filed: Jan. 8, 2009

(65) Prior Publication Data
US 2009/0182480 A1    Jul. 16, 2009

(30) Foreign Application Priority Data

Jan. 10, 2008 (DE) .......................... 10 2008 003 834

(51) Int. Cl.
*F01L 13/00* (2006.01)
(52) U.S. Cl.
USPC ....................................... 701/102; 123/90.16
(58) Field of Classification Search
USPC ............................ 701/102; 123/90.15–19.18
See application file for complete search history.

(56) References Cited

U.S. PATENT DOCUMENTS

| 2004/0129249 A1* | 7/2004 | Kondo .......................... 123/346 |
| 2005/0188931 A1* | 9/2005 | Akasaka et al. ............ 123/90.16 |
| 2009/0118987 A1* | 5/2009 | Morita et al. ................. 701/106 |

FOREIGN PATENT DOCUMENTS

| JP | 8170549    | 7/1996 |
| JP | 9256879    | 9/1997 |
| JP | 2002180877 | 6/2002 |
| JP | 2004176642 | 6/2004 |
| JP | 2005172593 | 6/2005 |
| JP | 2005240750 | 9/2005 |

\* cited by examiner

*Primary Examiner* — Stephen K Cronin
*Assistant Examiner* — Arnold Castro
(74) *Attorney, Agent, or Firm* — King & Spalding L.L.P.

(57) ABSTRACT

A method for adapting a preset value for a minimum valve stroke in an internal combustion engine, has the following steps: Replace the previous value for the minimum valve stroke with a new value; Determine an operating parameter of the internal combustion engine; Restore the previous value for the minimum valve stroke if the operating parameter is outside of a defined value range; otherwise retain the new value.

18 Claims, 2 Drawing Sheets

METHOD AND CONTROL DEVICE FOR ADAPTING A MINIMUM VALVE STROKE

CROSS-REFERENCE TO RELATED APPLICATIONS

This application claims priority to German Patent Application No. 10 2008 003 834.2 filed Jan. 10, 2008, the contents of which is incorporated herein by reference in its entirety.

TECHNICAL FIELD

The invention relates to a method and device for adapting a minimum valve stroke in an internal combustion engine.

BACKGROUND

Known internal combustion engines have cylinders in which a gaseous mixture of fuel and air is burnt in order to generate torque. The quantity of mixture admitted into a cylinder prior to ignition is decisive with regard to the torque delivered by said cylinder. To enable the torque delivered by the internal combustion engine to be adapted to different loads, known internal combustion engines have throttle valves which reduce the admission of mixture into the cylinders in a controllable way. However, the use of throttle valves is linked to throttle losses stemming from the resistance to flow which throttle valves cause.

To prevent throttle losses it is known for the quantity of gas flowing into a cylinder to be regulated by means of a valve stroke. Depending on the desired quantity of mixture to be admitted to the cylinder, one or more inlet valves on the cylinder are opened to a greater or lesser extent. This solution offers improved efficiency due to the reduction in throttle loss. The inlet valves can be opened mechanically, electro-mechanically or electrically. For example the inlet valves can be mechanically actuated by means of an adjustable intermediate mechanism that uses a camshaft.

In the prior art the valves of some or all of the cylinders are actuated by a common camshaft. Then the same valve stroke is set for each cylinder and consequently every cylinder receives an identical amount of mixture. In practice, though, tolerances arising during manufacture and in the components themselves lead to a variation in the resulting valve stroke and therefore also to a variation in the amount of mixture per cylinder. As a consequence the individual cylinders deliver different amounts of torque. When the valve strokes are small these differences have a particularly strong effect, since the percentage deviation is at its greatest in these conditions. Differences in the filling and torque amounts between the individual cylinders lead not only to increased rough running in the internal combustion engine but also to variations in the mixture attended by a worsening of exhaust gas quality together with increased engine wear.

Since the effects of manufacturing and component tolerances are particularly serious when the valve stroke settings are small, it is known in the prior art for a value to be established for a minimum valve stroke which guarantees an acceptable torque deviation in the different cylinders and which the valve stroke must not fall below. This value is empirically determined according to the prior art for a series of internal combustion engines and then permanently specified for every exemplar of the series. The chosen value is large enough to ensure that all exemplars in the series provide satisfactory running despite manufacturing and component tolerances.

However, due to this necessarily quite large minimum valve stroke value it is not possible to decrease the power of the internal combustion engine by reducing the valve stroke, and this effect must therefore be reproduced by using the throttle valve. This in turn gives rise to the throttle losses already described.

SUMMARY

According to various embodiments, a method and a device for adapting a minimum valve stroke in an internal combustion engine can be provided.

According to an embodiment, a method for adapting a preset value for a minimum valve stroke in an internal combustion engine, comprising the following steps: Replace the previous value for the minimum valve stroke with a new value; Determine an operating parameter of the internal combustion engine; Restore the previous value for the minimum valve stroke if the operating parameter is outside of a defined value range; otherwise retain the new value.

According to a further embodiment, a lambda signal can be determined as an operating parameter. According to a further embodiment, an acoustic signal of the internal combustion engine can be determined as an operating parameter. According to a further embodiment, a pressure can be determined as an operating parameter. According to a further embodiment, a rough running of the internal combustion engine can be determined as an operating parameter.

According to another embodiment, a control device may have a memory device that is provided in order to control a valve stroke in an internal combustion engine, wherein the control device holds a value for a minimum valve stroke in the memory device, and wherein the control device is provided in order to change the value for the minimum valve stroke.

According to yet another embodiment, the control device can be provided in order to execute the above described method.

According to a further embodiment, the control device may hold at least two different minimum valve stroke values and these values are allocated to different valves or cylinders. According to a further embodiment, the control device can be designed to change a setting of a throttle valve in the internal combustion engine if a value for a valve stroke is below a defined limiting value. According to a further embodiment, the control device can be designed to change a setting of a camshaft in the internal combustion engine if a value for a valve stroke is below a defined limiting value. According to a further embodiment, the control device can be designed to change an ignition advance angle of a cylinder if a value for a valve stroke is below a defined limiting value. According to a further embodiment, the control device can be designed to change a mixture ratio of a cylinder if a value for a valve stroke is below a defined limiting value. According to a further embodiment, a value for a minimum valve stroke can be used as a defined limiting value.

BRIEF DESCRIPTION OF THE DRAWINGS

The invention will be explained in greater detail below with the aid of the exemplary embodiments shown in the drawings. These show the following.

DETAILED DESCRIPTION

Figure 1:
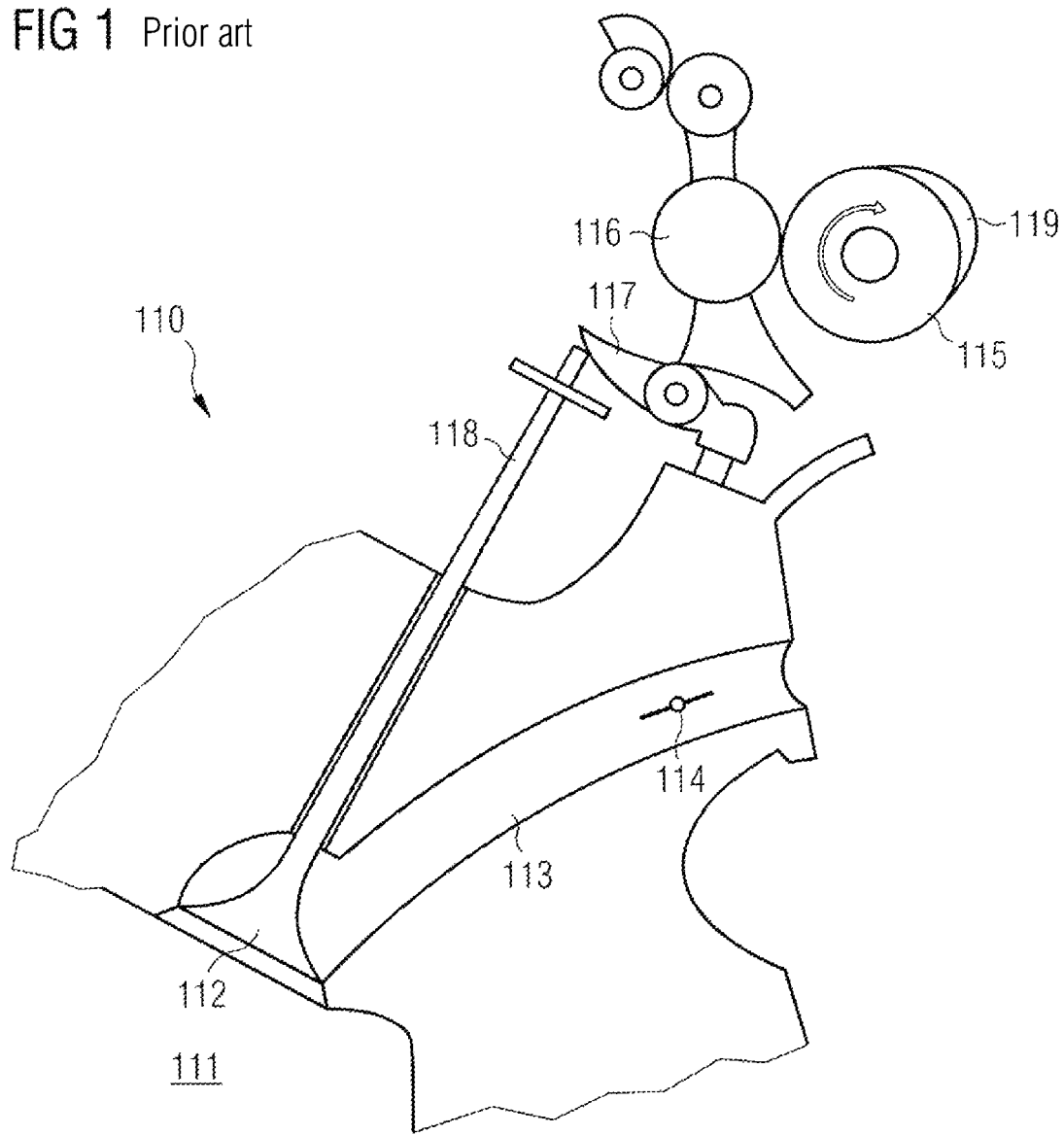
FIG. 1 A section of a cylinder from an internal combustion engine having an inlet valve with controllable valve stroke.

A method according to various embodiments for adapting a preset value for a minimum valve stroke in an internal combustion engine involves replacing the previous value for the minimum valve stroke with a new value, determining an operating parameter of the internal combustion engine, restoring the previous value for the minimum valve stroke if the operating parameter is outside an established range, but otherwise retaining the new value.

Advantageously this method enables the value of a minimum valve stroke to be adapted individually to an actual internal combustion engine. In this method the value does not need to be set high enough to be usable in all exemplars of a series of internal combustion engines affected by manufacturing and component tolerances. Instead an individual and optimally adapted value for a minimum valve stroke can be used for each exemplar.

Consequently a wider power range can be produced in the internal combustion engine by changing the valve stroke. Advantageously this increases the efficiency of the internal combustion engine.

Preferred embodiments of the method use a lambda signal, an acoustic signal of the internal combustion engine, a pressure, a rough running of the internal combustion engine or a combination of these parameters as an operating parameter.

Advantageously, determining these operating parameters of the internal combustion engine makes it possible to establish the value for the minimum valve stroke below which a no longer acceptable torque inequality or a no longer acceptable mixture deviation between the cylinders of the internal combustion engine is set.

A control device according to various embodiments has a memory device and is provided in order to control a valve stroke in an internal combustion engine, wherein the memory device of the control device holds a value for a minimum valve stroke, and wherein the control device is provided in order to change the value of the minimum valve stroke.

Advantageously, the control device according to various embodiments permits the value for the minimum valve stroke to be individually adapted to a particular internal combustion engine.

In an embodiment the control device is designed to execute the method.

In a further embodiment the control device holds at least two different minimum valve stroke values which are allocated to different valves or cylinders in the internal combustion engine.

Advantageously this makes cylinder-specific or valve-specific adaptation of the minimum valve stroke possible. It also equalizes manufacturing and component tolerances between the individual valves or cylinders. This enables the internal combustion engine to deliver even lower power without the addition of a throttle valve.

In further embodiments the control device is designed to change a throttle valve setting of the internal combustion engine or a camshaft setting of the internal combustion engine if a value required for a valve stroke is below the minimum valve stroke value.

Advantageously this makes it possible to operate the internal combustion engine even in the lower load range without causing excessively strong torque and mixture deviations in the different cylinders together with the attendant negative characteristics due to the valve stroke being too low.

In further embodiments the control device is designed to change an ignition advance angle or a mixture ratio of a cylinder if the value of an actual valve stroke is below the minimum valve stroke value.

Advantageously this makes it possible to operate the internal combustion engine even in the lower load range simply by means of valve stroke control and to equalize the resulting torque deviations of the cylinders by other means. It is then possible to do away with the use of a throttle valve and the associated throttle losses even in the lower load range of the internal combustion engine.

FIG. 1 shows a section of a cylinder 110 of an internal combustion engine 100 known per se. The cylinder has a combustion chamber 111 in which a mixture of air and fuel can be burnt in order to transfer force via a piston (not shown) to a crank shaft (not shown). The combustion chamber 111 is connected to an inlet manifold 113 via a valve 112 through which air or an air-fuel mixture can be drawn in. The inlet manifold 113 can be provided with a throttle valve 114 designed to control the amount of air drawn in by the combustion chamber 111 and/or the amount of air-fuel mixture drawn in by the combustion chamber 111. One throttle valve 114 can be provided per cylinder 110 of the internal combustion engine 100, or a common throttle valve 114 can be provided for all cylinders 110 of the internal combustion engine 100. In another embodiment the throttle valve 114 can be done away with entirely.

The valve 112 must be open in order to permit air or an air-fuel mixture to be drawn from the inlet manifold 113 into the combustion chamber 111. For this purpose the valve 112 has a lifter 118. A camshaft 115 which rotates about its long axis is provided with a cam 119 that can exert force on the lifter 118 of the valve 112 via an intermediate lever 116 and a cam follower 117 in order to open the valve 112. A spring (not shown) is provided in order to close the valve 112 again after an opening action.

The position of the intermediate lever 116 relative to the cam follower 117 and the camshaft 115 can be changed by means of a stepper motor (not shown) and a spring element (not shown). Depending on the position of the intermediate lever 116, a rotation of the camshaft 115 causes the valve 112 to open with different valve strokes. The amount of gas drawn into the combustion chamber 111 when the valve 112 is opened depends on the valve stroke concerned. Regulating the valve stroke makes it possible to regulate the amount of mixture admitted into a cylinder 110 of the internal combustion engine 100. Said regulation is performed by a control device 101 (not shown in FIG. 1) which is designed to drive the stepper motor.

The camshaft 115, cam 119, intermediate lever 116, cam follower 117, valve 112 and lifter 118 must be manufactured with greater precision in order to enable an accurate and reproducible valve stroke setting. Nonetheless manufacturing and component tolerances lead to some variation in the valve stroke that actually results, and therefore also to deviations in the amount of mixture admitted into the cylinder. The percentage deviation is at its greatest in the small valve stroke range.

Differences in filling quantities between individual cylinders 110 of the internal combustion engine 100 cause the different cylinders 110 to provide different contributions to the torque delivered by the internal combustion engine 100. The consequence of this is increased rough running of the internal combustion engine 100, causing greater wear of the mechanical components in the internal combustion engine 100. Inaccuracies in the valve stroke and consequent inaccuracies in the filling quantity of a cylinder 110 also cause a deviation in the mixture, leading to an increase in harmful emissions.

To avoid an excessive deviation in the valve strokes of the different cylinders 110 in an internal combustion engine 100, the prior art establishes a minimum valve stroke value below which the valve stroke must not fall.

In other embodiments the valve 112 of the internal combustion engine 100 can be opened in another way. For example the valve 112 can be actuated by an electrical or electromechanical adjustment mechanism such as a piezoelectric actuator driven by the control device 101.

Figure 2:
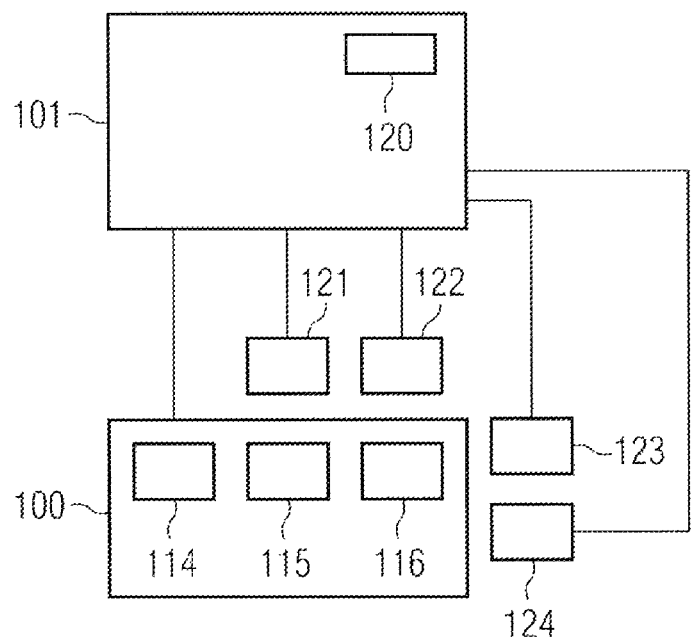
FIG. 2 A schematic diagram of an internal combustion engine having a control device according to an embodiment.

FIG. 2 shows a control device 101 of an internal combustion engine 100 according to an embodiment. The control device 101 is designed to control the internal combustion engine 100 in accordance with various nominal values and operating parameters. The internal combustion engine is equipped with one or more throttle valves 114 and one or more camshafts 115, for example. The control device 101 is designed to change settings of the throttle valve 114 and camshaft 115. The control device 101 is linked to a series of sensors which the control device 101 can use to determine various operating parameters of the internal combustion engine 100. For example the control device 101 can be linked to an acoustic sensor 121 which delivers information about an operating noise in the internal combustion engine 100. The control device 101 can also be equipped with a pressure sensor 122 which delivers information about a pressure at a location inside or outside of the internal combustion engine 100. The control device 101 can also be connected to a lambda probe 123 which delivers information about the composition of an exhaust gas of the internal combustion engine 100. The control device 101 can also be connected to a sensor for rough running of the internal combustion engine 100, delivering information about mechanical rough running of the internal combustion engine 100.

The control device 101 is designed to change the valve stroke of the valves 112 on the cylinder 110 of the internal combustion engine 100 in accordance with the power required from the internal combustion engine 100. In the event of an increase in the required power, the control device increases the valve stroke of the valves 112 of the cylinders 110 in the internal combustion engine 100. In the case of a reduction in the required power, the control device 101 reduces the valve stroke of the valves 112 in the internal combustion engine 100. The control device 101 can change the valve stroke of the valves 112 by, for example, manipulating the intermediate lever 116 of the cylinders 110 in the internal combustion engine 100. The control device 101 has a memory device 120 that stores a value for a minimum valve stroke.

Figure 3:
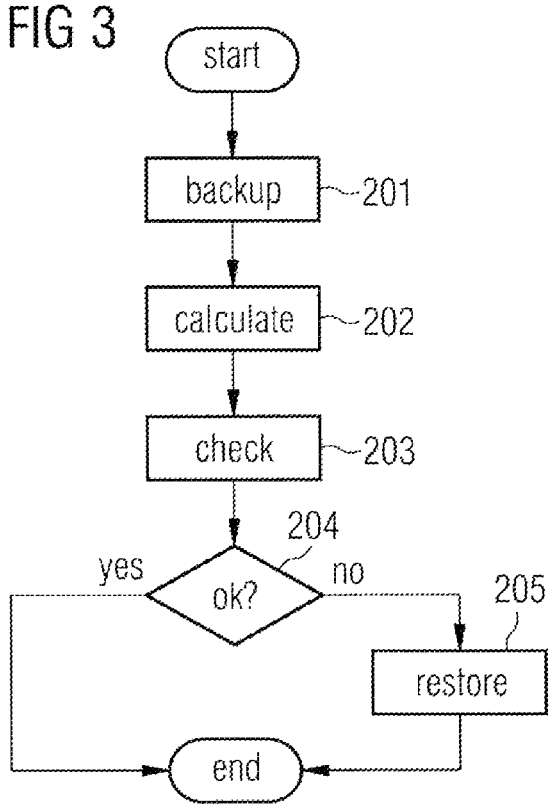
FIG. 3 A flowchart of a method for adapting a minimum valve stroke in an internal combustion engine according to an embodiment.

FIG. 3 shows the flowchart of a method for adapting the minimum valve stroke of the internal combustion engine 100, using as an example the way in which it can be executed by the control device 101.

In a first method step 201 a copy of the previous minimum valve stroke value is stored.

In a second step 202 a new value for a minimum valve stroke is computed. This can be done for example by changing the previous value for the minimum valve stroke by a predetermined or random amount in a predetermined or random direction. In the further sequence of the method the newly computed value is used as the value for the minimum valve stroke of the internal combustion engine.

In a third method step 203 an operating parameter of the internal combustion engine 100 is determined. The operating parameter can be for example a signal from a lambda probe 123. The operating parameter can also be a signal from an acoustic sensor 121, a signal from a pressure sensor 122 or a signal from a sensor for rough running 124 of the internal combustion engine 100. The operating parameter can also be another measured variable which delivers information about whether a desired property of the internal combustion engine is present.

The next method step 204 checks whether the operating parameter determined in step 203 is within a specified range. If the operating parameter is a signal from an acoustic sensor 121, the check can determine whether for example the operating noise emitted by the internal combustion engine 100 is below a defined limiting value. If the operating parameter is a signal from a lambda probe 123, the check can determine whether the composition of the exhaust gas from the internal combustion engine 100 is within a specified value range.

If the comparison in step 204 gives the result that the operating parameter determined is within the specified value range, the new value computed in method step 202 can be retained for the minimum valve stroke of the internal combustion engine 100, at which point the method ends. If the operating parameter determined in step 203 is found to be outside of the specified value range when a comparison is made in step 204, the value for the minimum valve stroke is replaced in method step 205 by the copy of the previous minimum valve stroke value that was stored in step 201. The method then ends.

In a further embodiment of the method, a plurality of operating parameters of the internal combustion engine 100 can be determined in step 203 and compared with specified value ranges in step 204. In a first embodiment the new minimum valve stroke value is only retained when all the determined operating parameters are within the value ranges assigned to them. In other embodiments the new minimum valve stroke value is also retained when only a defined number of operating parameters are within the value ranges assigned to them. In further embodiments the plurality of operating parameters can be differently weighted in order to decide whether the new minimum valve stroke value needs to be retained. In these embodiments it is possible to increase the accuracy of the described method and reduce its proneness to error.

In one embodiment the control device 101 is designed to execute the method shown in FIG. 3 at defined times during the operation of the internal combustion engine 100. This is always possible when the power required from the internal combustion engine 100 is so low that the valves 112 can be opened with the minimum valve stroke. In this embodiment an optimum value for the minimum valve stroke of an internal combustion engine 100 can be determined by the control device 101 making repeated use of the described method. It is also possible to compensate for changes in the accuracy of the valve stroke settings of the different valves 112 in the internal combustion engine 100 due to ageing characteristics by executing the described method over again.

In another embodiment the method shown in FIG. 3 is executed once only after the assembly of an internal combustion engine and stored in the memory device 120. In this embodiment it is also possible to determine an optimum value for the minimum valve stroke of the internal combustion engine 100 that is independent of manufacturing and component tolerances.

In this embodiment the method is executed by a control device 101, or by some other equipment such as a diagnostic device, or by a person.

In a further embodiment, the described method is executed once only for a series of an internal combustion engine 100. The value determined for the minimum valve stroke is then stored in the memory devices 120 of all the internal combustion engines 100 in the series. The operating parameters determined in method step 203 shown in FIG. 3 can be a signal from a lambda probe 123 for example. However, the operating parameter determined can also be for example an assessment of the rough running of the internal combustion engine 100 determined in a vehicle test carried out by a person.

In this embodiment also, the method is executed by a control device 101, or by some other device, or by a person.

In another embodiment the control device 101 stores a value table in which minimum valve stroke values are held as a function of values for a mileage reading of the internal combustion engine 100. The control device 101 can infer a suitable minimum valve stroke value from said table in accordance with the distance which the vehicle driven by the internal combustion engine 100 has covered. In this way it is likewise possible to compensate for ageing characteristics of the internal combustion engine 100.

In a further embodiment, different components of the internal combustion engine 100, such as the intermediate lever 116, cam follower 117 or valve 112, are calibrated before the internal combustion engine 100 is assembled and divided into different quality groups according to their degree of deviation from a nominal state. After the internal combustion engine 100 has been assembled a value is determined for the minimum valve stroke in accordance with the quality groups from which the built-in components have been taken. This value can be inferred from, for example, an empirically determined table that contains a suitable value for the minimum valve stroke for each possible combination of component qualities.

If during the operation of the internal combustion engine 100 there is a demand for power which is so small that in order to achieve it the valves 112 in the internal combustion engine 100 would have to be actuated at a valve stroke that is below the minimum valve stroke, different procedures are possible depending on the embodiment.

In a first embodiment a control device 101 reduces the actual valve stroke only as far as the minimum valve stroke value stored in the memory device 120. If the power delivered by the internal combustion engine 100 needs to be reduced further, the control device 101 reduces the power of the internal combustion engine by adjusting the camshaft 115. The control device 101 offsets the rotation of the camshaft 115 for this purpose. This has the effect of shifting the instant in time at which a valve 112 of a cylinder 110 is opened. Since different pressure ratios predominate at different times in the combustion chamber 111 of a cylinder 110 in the internal combustion engine 100, a change in the time at which a valve 112 opens also causes a change in the resulting amount of mixture admitted to the cylinder and thus changes the power delivered by the internal combustion engine 100. Alternatively the control device 101 can change the angle of aperture of a throttle valve 114 in order to reduce the amount of mixture admitted to the cylinder 110 of the internal combustion engine.

In another embodiment of the control device 101, the control device 101 reduces the valve stroke of the valves 112 in the internal combustion engine 100 to values that are even lower than the minimum valve stroke value stored in the memory device 120. The differences occasioned by manufacturing and component tolerances in the individual valves 112 and cylinders 110 in the internal combustion engine 100 give rise to differences in the extent to which the individual cylinders 110 are filled with mixture. As already remarked, these differences in filling lead to different contributions from the individual cylinders 110 to the torque delivered by the internal combustion engine 100, bringing about an increase in rough running, harmful emissions and engine wear. In order to counteract this, the control device 101 can equalize the torque of the cylinders 110. For this purpose the control device 101 can adjust an ignition advance angle or ignition timing of one or more cylinders 110, or change a mixture ratio of an air-fuel mixture admitted to a cylinder.

In this embodiment the control device 101 must be designed to detect which cylinder 110 in the internal combustion engine 100 needs an increase or reduction in delivered torque. This is possible since the individual cylinders 100 in an internal combustion engine 100 are ignited in chronological sequence. If one or more of the previously mentioned or other operating parameters of the internal combustion engine 100 can be determined quickly enough, the control device 101 can use this information to adjust the respective torque contributions of the different cylinders 110 independently of one another. The control device 101 can then equalize differences in the torque contributions of the individual cylinders 110 by direct intervention on the ignition advance angle or mixture. In this embodiment therefore it is possible in certain circumstances to do away with using the throttle valve 114 or offsetting the rotation of the camshaft 115.

What is claimed is:

1. A method for adapting and applying a preset value for a minimum valve stroke in an internal combustion engine, comprising the following steps:
   replacing a previous value for the minimum valve stroke with a new value;
   determining an operating parameter of the internal combustion engine;
   restoring the previous value for the minimum valve stroke if the operating parameter is outside of a defined value range and otherwise retaining the new value;
   identifying a demand for power corresponding to a valve stroke that is below the minimum valve stroke, and in response:
      applying the minimum valve stroke; and
      automatically reducing the power produced by the engine by offsetting a rotation of the camshaft to shift an opening timing of the valve.

2. The method according to claim 1, wherein a lambda signal is determined as an operating parameter.

3. The method according to claim 1, wherein an acoustic signal of the internal combustion engine is determined as an operating parameter.

4. The method according to claim 1, wherein a pressure is determined as an operating parameter.

5. The method according to claim 1, wherein a rough running of the internal combustion engine is determined as an operating parameter.

6. A control device in an internal combustion engine,
   wherein the control device holds a value for a minimum valve stroke in a memory device,
   wherein the control device is further operable to change the value for the minimum valve stroke, and
   wherein the control device is further operable to:
      identify a demand for power corresponding to a valve stroke that is below the minimum valve stroke, and in response:
         apply the minimum valve stroke; and
         reduce the power produced by the engine by offsetting a rotation of the camshaft to shift an opening timing of the valve.

7. The control device according to claim 6, wherein the control device is operable to replace the previous value for the minimum valve stroke with a new value; to determine an operating parameter of the internal combustion engine; to restore the previous value for the minimum valve stroke if the operating parameter is outside of a defined value range and otherwise to retain the new value.

8. The control device according to claim 6, wherein the control device holds at least two different minimum valve stroke values and these values are allocated to different valves or cylinders.

9. The control device according to claim 6, wherein the control device is operable to change a setting of a throttle valve in the internal combustion engine if a value for a valve stroke is below a defined limiting value.

10. The control device according to claim 6, wherein the control device is operable to change a setting of a camshaft in the internal combustion engine if a value for a valve stroke is below a defined limiting value.

11. The control device according to claim 6, wherein the control device is operable to change an ignition advance angle of a cylinder if a value for a valve stroke is below a defined limiting value.

12. The control device according to claim 6, wherein the control device is operable to change a mixture ratio of a cylinder if a value for a valve stroke is below a defined limiting value.

13. The control device according to claim 6, wherein a value for a minimum valve stroke is used as a defined limiting value.

14. A device for adapting and applying a preset value for a minimum valve stroke in an internal combustion engine, comprising:
   means for replacing the previous value for the minimum valve stroke with a new value;
   means for determining an operating parameter of the internal combustion engine;
   means for restoring the previous value for the minimum valve stroke if the operating parameter is outside of a defined value range and otherwise for retaining the new value; and
   means for identifying a demand for power corresponding to a valve stroke that is below the minimum valve stroke, and in response:
     applying the minimum valve stroke; and
     automatically reducing the power produced by the engine by offsetting a rotation of the camshaft to shift an opening timing of the valve.

15. The device according to claim 14, wherein a lambda signal is determined as an operating parameter.

16. The device according to claim 14, wherein an acoustic signal of the internal combustion engine is determined as an operating parameter.

17. The device according to claim 14, wherein a pressure is determined as an operating parameter.

18. The device according to claim 14, wherein a rough running of the internal combustion engine is determined as an operating parameter.

* * * * *